(12) United States Patent
DeConde et al.

(10) Patent No.: US 7,437,953 B2
(45) Date of Patent: Oct. 21, 2008

(54) METHOD AND APPARATUS FOR PROTECTION OF CONTOUR SENSING DEVICES

(76) Inventors: Keith T DeConde, 1990 Cronwell Dr., San Jose, CA (US) 95125; Joram Diamant, 11 Thune Ave., Moraga, CA (US) 94556; Srinivasan K. Ganapathi, 48860 Green Valley Rd., Fremont, CA (US) 94537; Joseph J. Pritikin, 2043 W. El Camino Real, #319, Mountain View, CA (US) 94040

( * ) Notice: Subject to any disclaimer, the term of this patent is extended or adjusted under 35 U.S.C. 154(b) by 0 days.

(21) Appl. No.: 11/762,732

(22) Filed: Jun. 13, 2007

(65) Prior Publication Data

US 2007/0289392 A1 Dec. 20, 2007

Related U.S. Application Data

(63) Continuation of application No. 11/090,315, filed on Mar. 25, 2005, now Pat. No. 7,316,167, which is a continuation-in-part of application No. 10/038,505, filed on Dec. 20, 2001, now Pat. No. 6,889,565, which is a continuation-in-part of application No. 09/571,765, filed on May 16, 2000, now Pat. No. 6,578,436.

(51) Int. Cl.
G01L 3/00 (2006.01)
(52) U.S. Cl. ............................ 73/862.042; 73/862.046; 73/862.626
(58) Field of Classification Search ............ 73/862.042, 73/862.626, 862.046; 361/283.1–283.4
See application file for complete search history.

(56) References Cited

U.S. PATENT DOCUMENTS

| | | | |
|---|---|---|---|
| 4,547,898 A | 10/1985 | Tsikos | 382/4 |
| 4,559,422 A | 12/1985 | Mironenko et al. | 200/67 |
| 4,570,139 A | 2/1986 | Kroll | 335/187 |
| 4,577,345 A | 3/1986 | Abramov | 382/4 |
| 4,582,985 A | 4/1986 | Loeberg | |
| 4,681,403 A | 7/1987 | Te Velde et al. | 350/334 |
| 4,684,770 A | 8/1987 | Pitrat et al. | 200/67 R |
| 4,758,698 A | 7/1988 | Moronenko et al. | 200/67 DB |
| 4,852,443 A | 8/1989 | Duncan et al. | |
| 4,904,832 A | 2/1990 | Nagahara et al. | 200/402 |
| 4,965,415 A | 10/1990 | Young et al. | 200/83 N |
| 5,017,747 A | 5/1991 | Nagahara et al. | 200/453 |
| 5,113,046 A | 5/1992 | Hauk | 200/332 |
| 5,121,089 A | 6/1992 | Larson | 333/107 |

(Continued)

FOREIGN PATENT DOCUMENTS

DE 19648767 6/1997

(Continued)

*Primary Examiner*—Andre J. Allen
*Assistant Examiner*—Jermaine Jenkins
(74) *Attorney, Agent, or Firm*—Pillsbury Winthrop Shaw Pittman LLP

(57) ABSTRACT

A sheet film protective covering for different types of contour sensing devices is described. In a preferred embodiment, this covering is a MYLAR® sheet film that is coated with a layer of a conductive material. The bottom surface of the MYLAR® film is also preferably coated with a layer of an adhesive. The sheet film covering preferably is contiguous and serves the purpose, among other things, to protect the underlying surface of the pressure-sensing device from contaminants and from electrostatic discharge, as well provide force concentration during use.

25 Claims, 7 Drawing Sheets

U.S. PATENT DOCUMENTS

| | | | |
|---|---|---|---|
| 5,212,473 A | 5/1993 | Louis | |
| 5,262,000 A | 11/1993 | Welbourn et al. | 156/643 |
| 5,309,006 A | 5/1994 | Willems et al. | 257/275 |
| 5,367,136 A | 11/1994 | Buck | 200/600 |
| 5,374,792 A | 12/1994 | Ghezzo et al. | 200/16 B |
| 5,400,662 A | 3/1995 | Tamori | 73/862.046 |
| 5,429,006 A | 7/1995 | Tamori | 73/862.046 |
| 5,446,251 A | 8/1995 | Lin | 200/284 |
| 5,453,590 A | 9/1995 | Mayer | 200/461 |
| 5,467,068 A | 11/1995 | Field et al. | 335/4 |
| 5,475,353 A | 12/1995 | Roshen et al. | 335/78 |
| 5,489,556 A | 2/1996 | Li et al. | 437/228 |
| 5,503,029 A | 4/1996 | Tamori | |
| 5,515,738 A | 5/1996 | Tamori | |
| 5,526,701 A | 6/1996 | Tamori | |
| 5,531,018 A | 7/1996 | Saia et al. | 29/622 |
| 5,554,964 A | 9/1996 | Jansseune | 335/207 |
| 5,558,210 A | 9/1996 | Jonischus | 200/321 |
| 5,623,552 A | 4/1997 | Lane | |
| 5,637,904 A | 6/1997 | Zettler | 257/417 |
| 5,638,946 A | 6/1997 | Zavracky | 200/181 |
| 5,652,559 A | 7/1997 | Saia et al. | 335/78 |
| 5,778,513 A | 7/1998 | Miu et al. | 29/602 |
| 5,810,604 A | 9/1998 | Kopp | |
| 5,821,596 A | 10/1998 | Miu et al. | 257/419 |
| 5,828,268 A | 10/1998 | Ando et al. | 330/124 D |
| 5,844,287 A | 12/1998 | Hassan et al. | |
| 5,864,296 A | 1/1999 | Upton | |
| 5,905,241 A | 5/1999 | Park et al. | 200/409 |
| 5,940,525 A | 8/1999 | Itsumi | |
| 5,942,733 A | 8/1999 | Allen et al. | |
| 5,946,176 A | 8/1999 | Ghoshal | 361/56 |
| 5,994,796 A | 11/1999 | De Las Santos | 307/113 |
| 6,020,564 A | 2/2000 | Wang et al. | 200/181 |
| 6,034,339 A | 3/2000 | Pinholt et al. | 200/181 |
| 6,037,719 A | 3/2000 | Yap et al. | 315/169.3 |
| 6,067,368 A | 5/2000 | Setlak et al. | |
| 6,155,120 A | 12/2000 | Taylor | |
| 6,346,739 B1 | 2/2002 | Lepert et al. | |
| 6,578,436 B1 | 6/2003 | Ganapathi | |
| 6,693,441 B2 | 2/2004 | Lane et al. | |
| 6,694,822 B1 | 2/2004 | Ganapathi | |
| 6,802,205 B2 * | 10/2004 | Barguirdjian et al. | 73/73 |
| 6,829,950 B2 * | 12/2004 | Ganapathi et al. | 73/862.046 |
| 6,862,942 B2 * | 3/2005 | Kawahata | 73/862.046 |
| 6,889,565 B2 | 5/2005 | DeConde | |
| 6,960,790 B2 * | 11/2005 | Miyai et al. | 257/77 |
| 7,249,513 B1 * | 7/2007 | Zipparo et al. | 73/625 |

FOREIGN PATENT DOCUMENTS

| | | |
|---|---|---|
| DE | 19631569 | 2/1998 |
| EP | 0459808 | 12/1991 |
| EP | 0650139 | 4/1995 |
| EP | 0769754 | 4/1997 |
| GB | 2243235 | 10/1991 |
| WO | WO 97/25798 | 7/1997 |

* cited by examiner

METHOD AND APPARATUS FOR PROTECTION OF CONTOUR SENSING DEVICES

RELATED APPLICATION DATA

This is a continuation of U.S. application Ser. No. 11/090,315 filed Mar. 25, 2005 now U.S. Pat. No. 7,316,167, which is a continuation-part of U.S. patent application Ser. No. 10/038,505 filed Dec. 20, 2001, now U.S. Pat. No. 6,889,565, which is a continuation-in-part of U.S. patent application Ser. No. 09/571,765 filed May 16, 2000, now U.S. Pat. No. 6,578,436, which are expressly incorporated by reference herein.

FIELD OF THE INVENTION

The invention generally relates to architectures, processes, and materials used to enhance the effectiveness of and to serve as a protection covering for sensing devices, and more specifically for contour sensing devices used to sense touch or capture images of textured surfaces, such as that of a fingerprint.

BACKGROUND OF THE INVENTION

A touch and contour sensing device, and more specifically, a device that senses user inputs either with a finger or stylus, or images textured surfaces like fingerprints is vulnerable to damage, caused by excessive mechanical forces during usage. Irreversible damage can also be caused by electrostatic discharge or ESD, since user objects or the user's finger may carry significant potential. To protect such a sensing device from mechanical abrasion, impact or scratching, and to also protect the sensing surface from electrostatic discharge induced damage, specialized and expensive techniques are known to cover the device with a protective coating.

In U.S. Pat. No. 6,693,441, Lane et al. describe a protective film coating made of a polymer containing conductive particles. In their preferred embodiment, the coating is intended as protection against mechanical impact. The coating contains conductive particles, and it is sprayed on to the sensing surface. One of the drawbacks is that the protective coating is only made of Teflon, which is a soft material, and can be scratched with sharp objects. In addition, the carbon particles that serve as conductive particles within the Teflon polymer matrix are also soft, and thus do not enable effective protection against mechanical damage. Another drawback is that the conductive particles in the coating are insulated from each other within the polymer, as a result of which the coating itself is not conductive. Since the coating as a whole is not conductive, it cannot provide protection against electrostatic discharge.

In U.S. Pat. No. 6,346,739, Lepert et al. describe a method of and apparatus for dissipation of electrostatic discharge using a patterned layer of conductive material that is deposited by vacuum deposition, and is an integrally formed part of the sensor to ensure that the gap between conductive plates is left uncovered. A separate insulating sheet film is then applied over this patterned conductive material layer, and electrical connections to the top surface are required to provide an electrical path.

Reference is hereby made to U.S. patent application Ser. No. 10/038,505 filed Dec. 20, 2001, titled "Fingerprint Image Sensing Device With Passive Sensor Array." Reference is also made to U.S. Pat. No. 6,578,436 titled "Method and Apparatus for Pressure Sensing." These references describe the use of a single "sheet film coating" made of a polymer such as MYLAR®, which provides limited mechanical protection as well as transmitting the force of the pressure applied, to the sensing elements on the sensing device by virtue of the effect of force concentration.

One drawback, however, of the sheet film protective coating in use such as the FID-102 above is that the coating, upon application of the occasional, excessive, accidental force like pressure from the fingernail of a finger, pressure from the tip of a pen, or the rubbing of an abrasive material on it, can get deformed or permanently indented. Once this happens, the images obtained from the sensing device are likely to be inaccurate or distorted. On the other hand, a thicker coating may be used so that it is less vulnerable to deforming forces. However, increasing the thickness makes the coating progressively mechanically stiffer, thereby leading to a loss of resolution on sensors that require high resolution, such as the fingerprint image sensor. A thick or inflexible coating can lead to cross-talk between adjacent switches on devices such as the fingerprint image sensor, as switches disposed under valleys on a fingerprint of a finger are pressed downward by the downward motion of the coating pressed down by adjacent ridges.

Accordingly, the present inventors have determined that there is a need for a protective covering that has various properties and can be applied without expensive and difficult techniques. One property is the coating being resistant to oil, water, alcohol, moisture, grease, and such chemical agents. Another is being resistant to mechanical damage caused by abrasive impact, scratches, and wear. Another property is being flexible enough to withstand the impact of an occasional, accidental, potentially mechanically damaging force, like that of a fingernail, pen tip, or abrasive material, as mentioned earlier. Still another is being sensitive enough so that there is no loss in resolution on the sensing device. And another property is having conductive properties, either inherent or induced, so that it can conduct electrostatic discharge away from the underlying components of the sensing device. Different embodiments of the present invention meet some or all the aforementioned properties.

SUMMARY OF THE INVENTION

One embodiment of the invention comprises a contiguous sheet film protective covering as a protective covering in contour sensing devices, the covering serving several purposes, including protection of the underlying contour sensing device from abrasive materials, moisture, water, alcohol, oil or grease, etc. and also protection from electrostatic discharge. The protective covering comprises a MYLAR® sheet film, coated with a conductive layer.

In one particular embodiment, the protective covering can be applied to existing contour sensing devices, without requiring specialized processing system, under room temperature and pressure conditions (RTP).

In another embodiment, the conductive layer is contiguous, thereby avoiding issues concerning alignment of the conductive layer with the sensing devices disposed below.

In a particular embodiment, the MYLAR® sheet film is then coated with a polymer, a polycarbonate, a poly ethylene naphtalate, a thermoplastic elastomer, a silicone elastomer, or any other such material which offers superior resistance to abrasion, scratches, moisture, grease etc. and which is either inherently conducting or can be modified to exhibit conductive properties, One embodiment of the invention uses blocked isocyanate derived polyurethane, dispersed with a conductive material in it, as a coating over MYLAR®. The induced conductive properties of the polyurethane serve to channel away potentially damaging Electrostatic Discharge from the underlying components of the sensing device.

Other embodiments are described and claimed.

BRIEF DESCRIPTION OF THE DRAWINGS

The foregoing aspects and advantages of the present invention will become better understood upon reading the following detailed description and upon reference to the drawings where:

FIG. 1-B illustrates the pulse response from the sensor when the ridge of a fingerprint presses down upon the top electrode of a sensor cell.

FIG. 2-B illustrates the principle of force concentration after an elastomer button has been fixed to the top electrode.

FIG. 2-C illustrates the principle of force concentration after the film has been placed on the sensing device.

DETAILED DESCRIPTION OF THE INVENTION

In the following description, it is understood that each recited element or structure can be formed by or be part of a monolithic structure, or be formed from multiple distinct structures. Unless otherwise specifically stated, the statement that a first layer or structure is disposed or deposited on a second layer or structure is understood to allow for the presence of parts of the first or second layer or structure that are not so disposed or deposited, and further allow for the presence of intermediate layers or structures between the first and second layers or structures. A set of elements is understood to include one or more elements. A plurality of elements is understood to include two or more elements. Any recitation of an element is understood to refer to at least one element.

The following description illustrates embodiments of the invention by way of example and not necessarily by way of limitation.

Figure 1A:
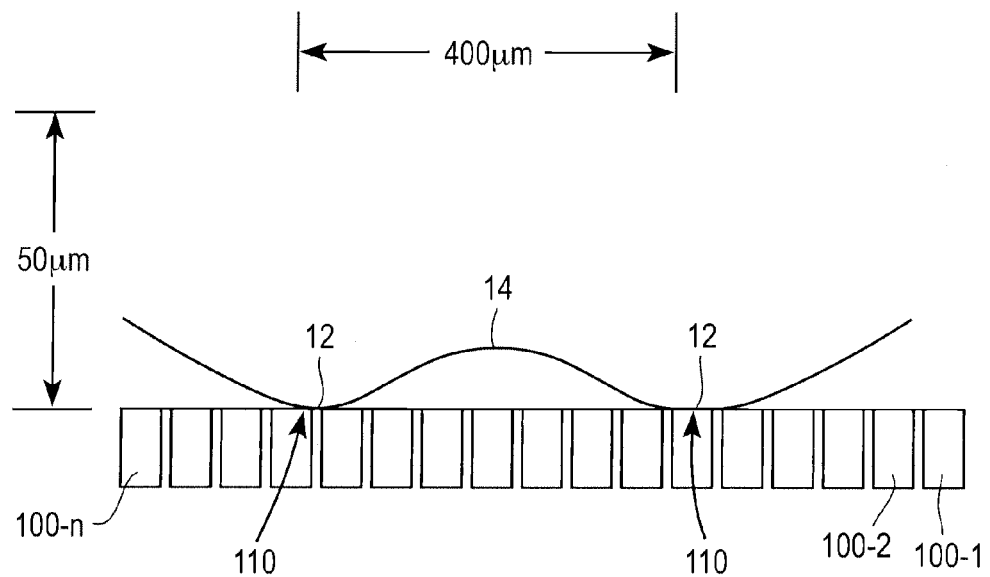
FIG. 1-A illustrates the positioning of ridges and valleys of a fingerprint on the sensor cells of a fingerprint image-sensing device.
Figure 1B:

In one embodiment, the sheet film is used as a protective covering on a micro-electromechanical sensing device, such as a fingerprint sensor as illustrated in FIGS. 1A and 1B. FIGS. 1A and B illustrate the positioning of a ridge 12 and valley 14 of a fingerprint 10 on the sensor cells 100-1 to 100-$n$ of the fingerprint image-sensing device. Further description can be derived by reference to U.S. patent application Ser. No. 10/038,505 filed Dec. 20, 2001, titled "Fingerprint Image Sensing Device With Passive Sensor Array." When a fingerprint is placed on the fingerprint image-sensing device, the ridges of the fingerprint press down against the upper electrodes of certain switches. When an upper electrode deflects downward, it establishes contact 110 with the corresponding lower electrode, thereby closing a mechanical switch. The upper electrodes that lie under the valley of the fingerprint are not sufficiently deflected to close the switches. Therefore, if a switch resides beneath a valley of the fingerprint, it remains open and if a switch is beneath a ridge of the fingerprint, it closes. When closed, a switch establishes electrical contact between the row and column leads corresponding to that switch. By assessing the state of the switch at each row-column intersection, one can generate a map 120 as shown by FIG. 1B, such as pulses or filtered pulses 122 corresponding to the contact points or the ridges on the fingerprint, and get an accurate reproduction of the fingerprint.

Figure 2A:
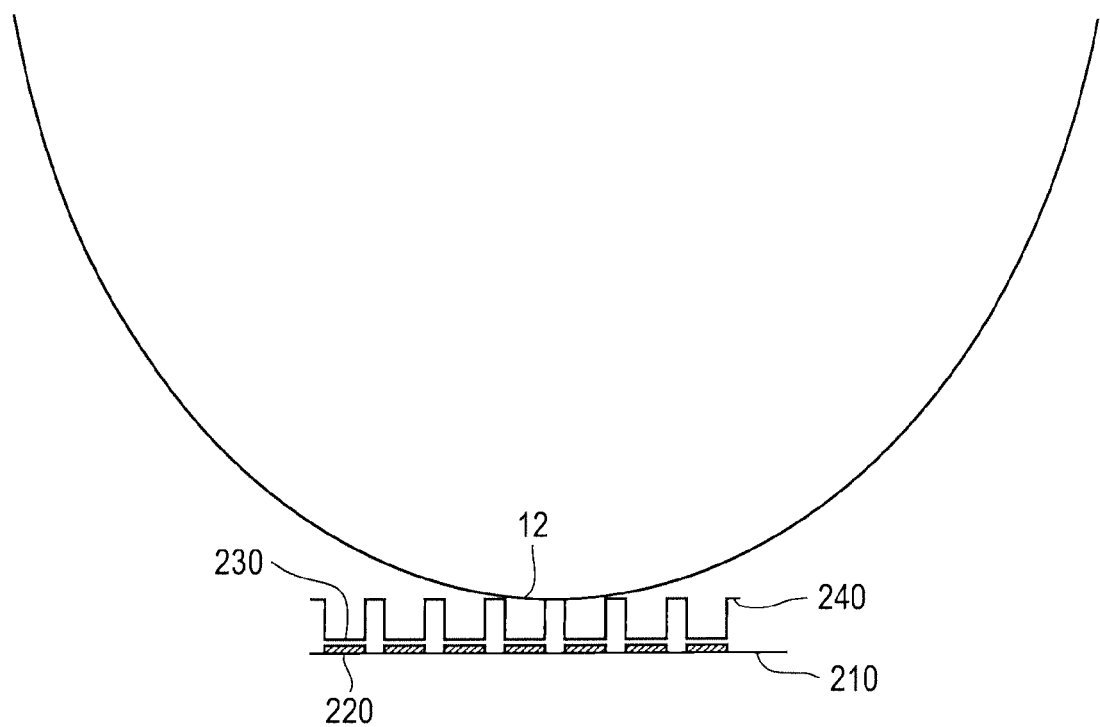
FIG. 2-A illustrates the principle of force concentration of a pressure applying force, without the use of an elastomer button.
Figure 2B:
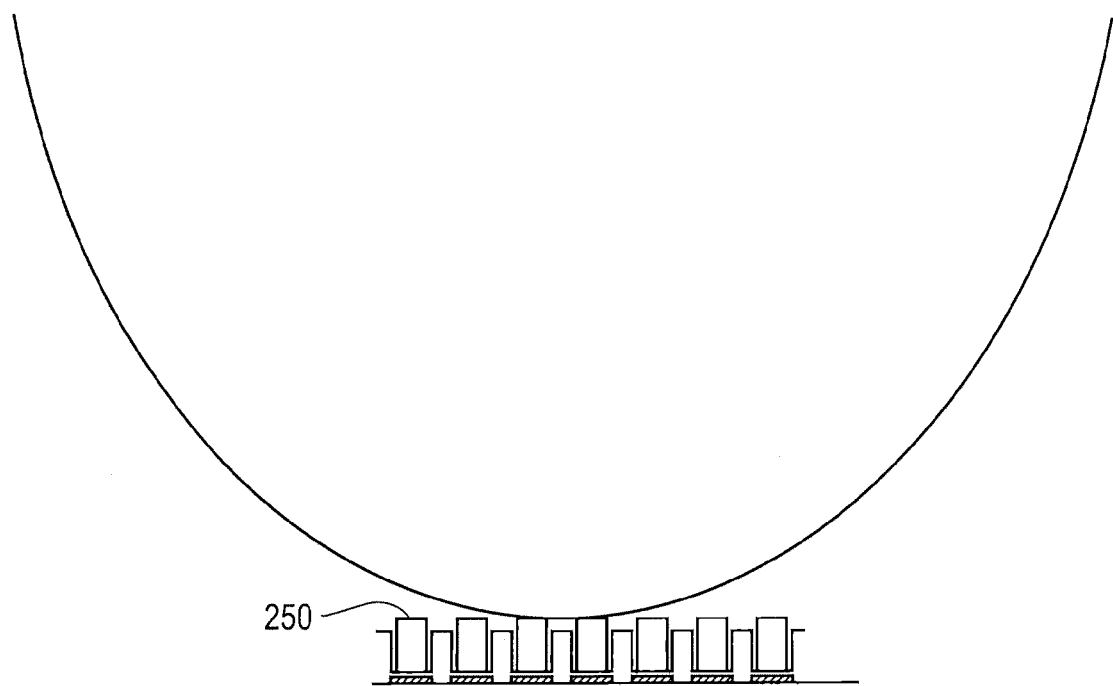
Figure 2C:
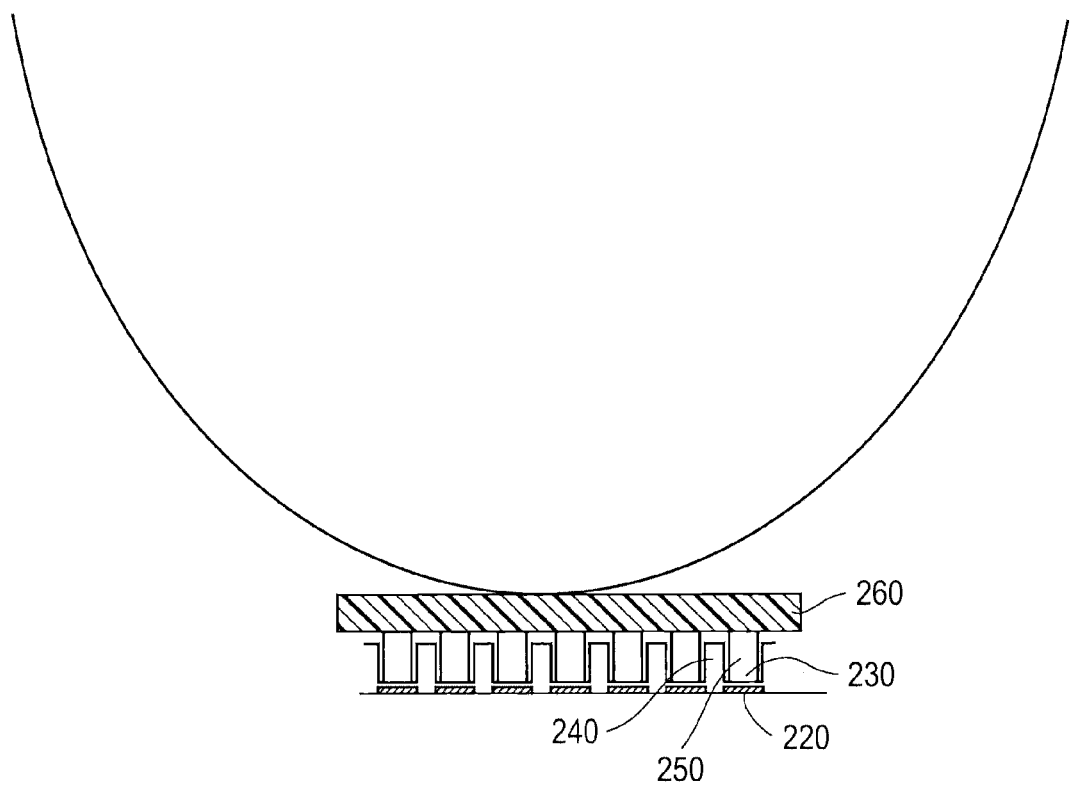

The upper electrode 230 is formed by a diaphragm, preferably circular in shape, held above the lower electrode 220 formed on a substrate 210, with the ability to deflect downward upon the application of a force. Each pixel on the sensing device 200 comprises one such diaphragm. FIGS. 2A, B, and C are cross sectional views of a partial row of pixels of a micro-electromechanical fingerprint image-sensing device. The width of a pixel is a fraction of the width of the ridge on the fingerprint, which, as is known, is made up of a series of ridges and valleys. It is noted, that the invention is preferably applied to devices in which each sensing device of the array of sensing devices is operable to discriminate the ridges from the valleys of the object being sensed when the ridge and the valley are spaced less than 800 microns apart. When pressure from a ridge 12 of the fingerprint is applied, the area of contact between the sensor and the ridge 12 spreads through a distance greater than the width of the pixel. Thus, most of the pressure from the ridge of the fingerprint does not reach the top electrode 230 of the sensing device, but is applied instead to the insulating layer 240, whose level is raised in relation to the diaphragm. Pressure applied to the insulator 240 is typically insufficient for imaging. To overcome this loss of pressure to the insulator 240, an elastomer button 250 as illustrated in FIG. 2B is fixed onto the top electrode of the diaphragm, and protrudes, in the illustrated example, for a distance of 5 um above the insulating layer. FIG. 2B illustrates the positioning of the elastomer button in the diaphragm opening of the fingerprint sensing device. When pressure from a ridge of the fingerprint is applied onto the elastomer button, the force is transmitted to the top electrode, which in turn is pressed downward. However, the ridge 12, being wider than the button 250, still applies a significant fraction of its pressure to the surrounding insulating layer 240, causing more of the force applied than desired to be transmitted to the insulating layer. In order to transmit as much of the force as possible of the pressure applied to the top electrode through the elastomer button, in a preferred embodiment a sheet film 260 is placed over the sensor of the sensing device as illustrated in FIG. 2C. The various combinations of layers that the sheet film 260 illustrated in FIG. 2C can have is described hereinafter.

Since the elastomer button 250 protrudes a certain distance over the insulating layer in the illustrated example, the sheet film 260 rests on the many elastomer buttons of the sensing device. Therefore, when a force is applied on the surface of the sensing device through the sheet film, the stiffness of the sheet film causes substantially all of the force to be directed into the top electrode through the elastomer button 250, as desired. This effect is known as force concentration.

Downward pressure applied through the sheet film to the elastomer button on the top electrode deforms the said top electrode, causing the electrode to close a circuit. When closed, the switch establishes electrical contact between the row and column corresponding to that switch, thereby sending a signal to the accompanying electronics to record a ridge on the fingerprint.

The above-described embodiment of the sensor array is provided with respect to a sensor that functions to sense a change in force. It is within the scope of the present invention that different types of sensors other than force-sensing sensors, such as capacitive sensors, can be used with the protective covering described herein.

Figure 3:
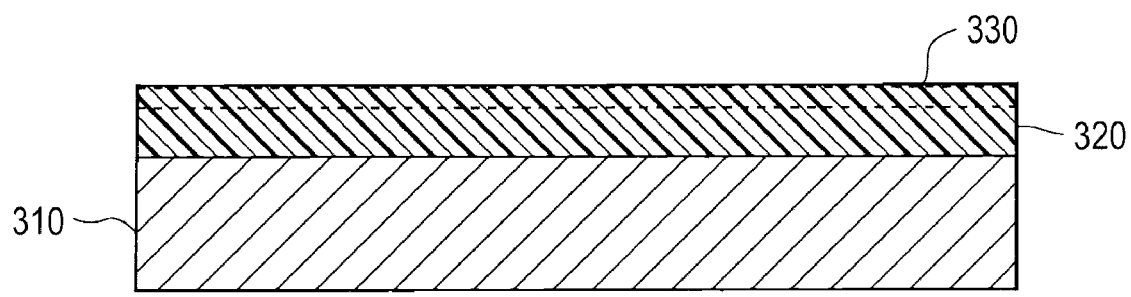
FIG. 3 is a schematic cross section illustrating the placement of a protective sheet film, and a thin film conductive coating over the said protective sheet film on a sensor substrate of a pressure-sensing device.

Sheet film. FIG. 3 is a schematic cross section illustrating a preferred embodiment of the sheet film of the present invention. A polymeric film 320 having a plurality of layers, such as PET/MYLAR®, from hereon referred to as MYLAR®, is laid/layered over the sensor substrate 310 of a fingerprint image-sensing device. The appropriate thickness of MYLAR® should take into consideration the force applied onto the sensing device vis-à-vis the mechanical Young's modulus of the MYLAR® film. For a capacitive sensor, too thick a film would result in parasitic capacitances between neighboring cells, and reduce the dynamic range of the device. The range of thickness of the MYLAR® film in a preferred embodiment of the invention is 1 um to 50 um, though in one embodiment, the MYLAR® film is preferably 3-9 um thick with a presently preferred thickness of 6 um thick. It should be noted that MYLAR® is the preferred choice in only one embodiment. Any material that is insoluble in moisture, water, alcohol, oil, grease, etc. has a high mechanical Young's modulus, has a relatively smooth surface, is unaffected by moisture, oil, grease, etc. and is manufacturable and can be drawn into sheets of desired thickness, can be used.

Top coating. To overcome its mechanical inadequacies, the top portion of the MYLAR® film is coated with a tough polymer layer 330, or another material capable of greater elastic reversible deformation than MYLAR®, that offers superior resistance to abrasion, scratches, moisture, grease etc. and that maintains the resolution of the sensing device and can be applied using high volume manufacturable processes on to the sensor surface, which is compatible with maintaining the performance of the sensor. A preferred embodiment of the invention uses a blocked isocyanate derived polyurethane as a coating over MYLAR®.

Blocked Isocyanates. Polyurethane can be derived from a blocked isocyanate. A blocked isocyanate is a one-component system, which is produced by blocking of an isocyanate group so that the isocyanate is unable to react at room temperature. This is usually achieved by reaction of the isocyanate with specific active hydrogen containing molecules, such as amines, oximes, or esters that are characterized by their weak urethane links. The blocked isocyanate, which can be a diisocyanate, a quasi-prepolymer, or a prepolymer can then be handled and processed without concern for further reaction, since no unreacted isocyanate remains. The blocked isocyanate formulation in the preferred embodiment comprises the isocyanate, polyols blocking agent, an organo-bismuth catalyst, and a surfactant. The resulting composition is then dissolved in a combination of solvents such as 1-Metoxy 2-Propanol and Tetrahydrofurane to get the desired viscosity. In the preferred embodiment, the blocked isocyanate is used in its liquid form for coating over the MYLAR® film in a Gravure coating process. The blocked isocyanate could also be coated on to the MYLAR® film using other known coating techniques including bar coating, roll coating, other web coating methods or extrusion coating.

When the coating process is complete, heat is applied to break the bonds of the blocking groups in the blocked isocyanate, allowing the isocyanate to react with the polyols blocking agent, and allowing the polyurethane to fully cure. Curing temperatures can be as high as 160 degrees centigrade, though the bonds of the blocking groups tend to break at approximately 120 degrees centigrade. Almost any compatible additive can be formulated into the polyurethane system, but it is preferable that the additives be free of water so as to avoid invalidating stoichiometric calculations or inadvertent carbon monoxide formation.

Typically, isocyanates used to produce polyurethane's are either aromatic or aliphatic, the latter being generally tougher and more scratch resistant.

The polyurethane coating serves the purpose, by virtue of its elasticity, of reducing the susceptibility of the MYLAR® film to deformation by a potentially mechanically damaging force. A pressure test, in which a vertical force of 120 grams was applied to the bare MYLAR® film using the equivalent of a ballpoint pen whose writing ball has a diameter of 2 mm, produced a lasting indentation of 600 nm. Note that the width of a fingernail is barely 300 um. Thus, a fingernail pressed with 120 grams of force would create a significantly higher pressure over the MYLAR® film. Every time such equivalent pressure is applied, further deformation of the MYLAR® film results. When the MYLAR® film is coated with the blocked isocyanate derived polyurethane, the same pressure test performed on the bare, uncoated MYLAR® film is conducted, and no lasting indentation or scratch is detected. The elasticity thus contributes to the blocked isocyanate derived coating providing an excellent resistance to abrasive materials and forces. The coating is also highly resistant to moisture, water, oil, grease, etc. If an aliphatic isocyanate is used in the composition of the blocked isocyanate, there is the added advantage of excellent UV stability.

The thickness of the blocked isocyanate coating is from 1 um to 30 um, though the preferred embodiment of the invention for the above application uses a coating having a range of 7-12 um, with a presently preferred 10 um thick coating of blocked isocyanate on the MYLAR® film.

The objective behind the blocked isocyanate derived polyurethane coating is to meet certain criteria, namely that of enhanced mechanical robustness, manufacturability, and maintenance of the resolution of the sensing device, among others. Therefore, any material that meets the aforementioned criteria may be used, and the blocked isocyanate derived polyurethane is only one of several options.

Figure 4:
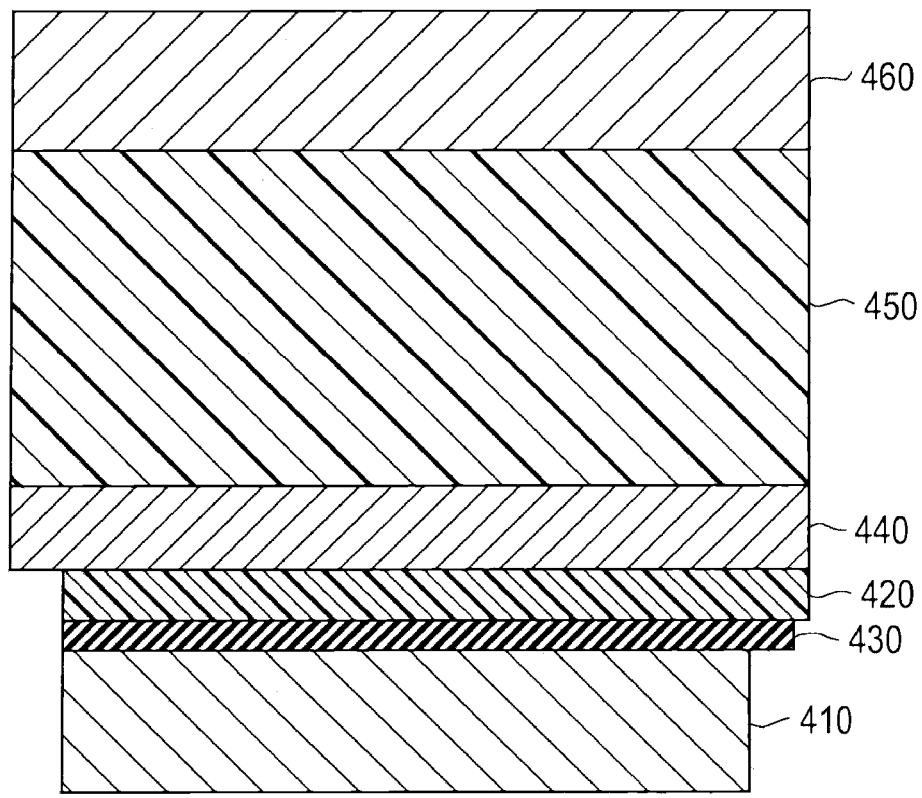
FIG. 4 illustrates an embodiment of the invention with supportive packaging.

Adhesive coating. In the illustrated example of FIG. 4, the MYLAR® film 430 rests on several elastomer buttons of the sensor. To adhere the MYLAR® film 430 onto the buttons (such as buttons 250 illustrated in FIG. 2B), it is coated with a layer of an adhesive 420. The adhesive 420 is a curable adhesive, which is either UV curable, heat curable, room temperature curable, or an adhesive curable by any other means. A preferred embodiment of the invention used as a protective covering on the sensing device employs an adhesive that is UV curable. The thickness of the adhesive coating 420 for the above application could be from 1 um to 20 um, preferably within a range of 1-5 um, with the presently preferred thickness of coating being 3 um. In the preferred embodiment, the Gravure coating technique is adopted for coating of the adhesive onto the MYLAR® film. The adhesive 420 could also be coated on to the MYLAR® film using other known coating techniques including bar coating, web coating, roll coating and extrusion coating. The adhesive 420, once coated, is covered with a PET release liner 410 that protects the adhesive from unwanted exposure. The PET release liner is coated with a layer of silicone rubber so that it does not adhere and can be easily peeled from the adhesive, when required. Application of the PET release liner to the MYLAR® is also accomplished on a MYLAR® roll, using roll-to-roll manufacturing techniques that are well known in the art.

Adhesion of base coating Once the adhesive 420 is applied to the lower surface of the MYLAR® film, the MYLAR® film is placed on to the elastomer buttons of the sensing device and a uniform hydrostatic pressure is applied to ensure mating between the buttons and the adhesive coated MYLAR® sheet film, which is accomplished in normal room conditions, and which does not require specialized processing equipment, such as vacuum deposition. The total area occupied by the elastomer buttons on the sensing substrate is approximately 20 percent. Therefore, 20 percent of the adhesive coating on the MYLAR® film sticks to the elastomer buttons. The adhesive is then cured using ultraviolet light, and the portion of the adhesive coated MYLAR® film that does not rest on the elastomer buttons loses its adhesion capabilities. The supportive package of sylagard layer 450 with PET backing 460 is also removed, leaving the 440 as the top layer.

Enhancements to the ESD robustness of the sheet film. MYLAR® 430 is an insulator. Its insulating properties are a good resistance to electrostatic discharge. However the MYLAR® 430 is extremely thin, and ablates locally when the strength of the electrostatic discharge from the force applied on the sensing device produces an electric field that surpasses the breakdown strength of the MYLAR® 430. The presence of the adhesive on one side and of the layer 440, such as the blocked isocyanate derived polyurethane coating, on the other side of the MYLAR® 430 make only a minor contribution in increasing the breakdown strength of the film due to its thinness (as compared to if the layer were much thicker), and as such ESD protection can still be a problem.

Thus, in order to protect the underlying sensor array and the adjacent circuitry from damage due to electrostatic discharge, it is preferable that the discharge be provided with a conductive path to ground by making layer 440 conducting.

The layer 440, such as blocked isocyanate derived polyurethane coating, is not inherently conducting, but when partially filled with a dispersion of conductive particles, exhibits conductive properties. A conductive material such as Indium Tin Oxide (ITO), silver, carbon nano-particles, carbon nanotubes, graphite, etc. can be dispersed effectively into the blocked isocyanate to get the desired conductivity. In the preferred embodiment, silver nanoparticles or carbon nanotubes are dispersed into the liquid blocked isocyanate prior to coating onto the top surface of the MYLAR® film. The said silver particles are dispersed into the blocked isocyanate at 70% weight, which translates into 18% volume. By providing the conductive properties using a dispersed conductor, the conductive layer becomes contiguous over the entire surface, which assists in implementation of the protective covering over the contour sensing devices disposed below, as there is no need for alignment of certain areas of the protective covering relative to the sensing devices.

Figure 5:
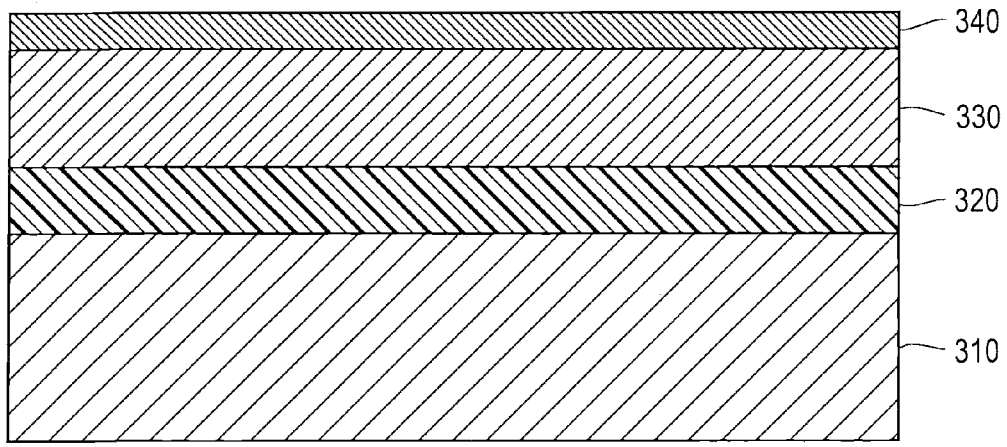
FIG. 5 illustrates an embodiment of the invention where the thin film conductive coating is applied over the top coat.

In cases where the dispersion of nanoparticles into the liquid topcoat material does not sufficiently reduce the resistance of the covering, a lower resistance MYLAR® film would serve to conduct away electrostatic discharge more effectively. It has been found that a thin conducting film, such as Indium Tin Oxide (ITO), silver, or any other conductive material that can be effectively coated over MYLAR®, significantly enhances the ability to conduct electrostatic discharge away from the sensing device. The conductive thin film can be coated onto the MYLAR®(g) film by known chemical vapor deposition techniques, though the preferred embodiment makes use of the sputtering process, well known in the art. In one embodiment of the invention in which the MYLAR® film is coated with a layer of Indium Tin Oxide, the Indium Tantalum Oxide coating exhibits a resistance of 100 ohms per square. The breakdown strength of the MYLAR® film can withstand a maximum electrostatic discharge of 16 kV when the resistance of the Indium Tantalum Oxide coating is as high as 155 ohms per square. Therefore any coating with a resistance of 155 ohms or less per square is preferred. Note that this thin film conductive coating can either be applied on the surface of the MYLAR® prior to applying the conductive top coat, or in an alternate embodiment, it can simply be applied over the top coat. In the case where the thin conducting film coating is applied over the top coat, it is not critical to make the top coat conducting, because in this case the thin conducting film coating can provide a direct discharge path to ground. FIG. 5 illustrates an embodiment of the invention where the thin film conductive coating 340 is applied over the top coat layer 330, which is disposed over MYLAR® 320.

Figure 6:
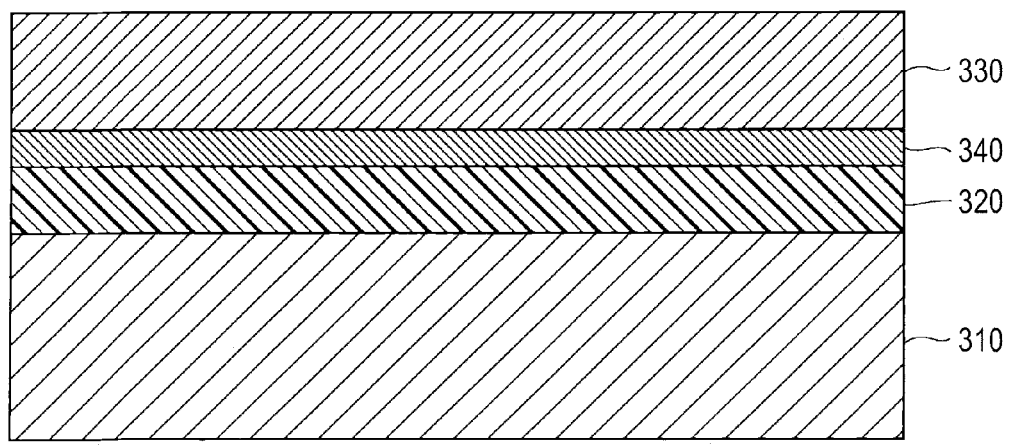
FIG. 6 shows the thin film conductive coating sandwiched between the sheet film and the top coat.

The conductive thin film coating 340 over the MYLAR® film, coupled with the layer 330, such as the coating of the blocked isocyanate derived polyurethane induced with conductive properties, behaves no differently than two resistors connected in parallel. And it is known to those well versed in the art, that the total resistance T of two resistors R1 and R2 connected in parallel, is less than either of the two individual resistances. The total resistance T is calculated by the formula T=(R1*R2)/(R1+R2). FIG. 6 shows the thin film conductive coating 340 sandwiched between the MYLAR® film 320 and the top layer 330, and conductive openings are made to ensure a path from the top surface to the conducting layer below.

Figure 7:
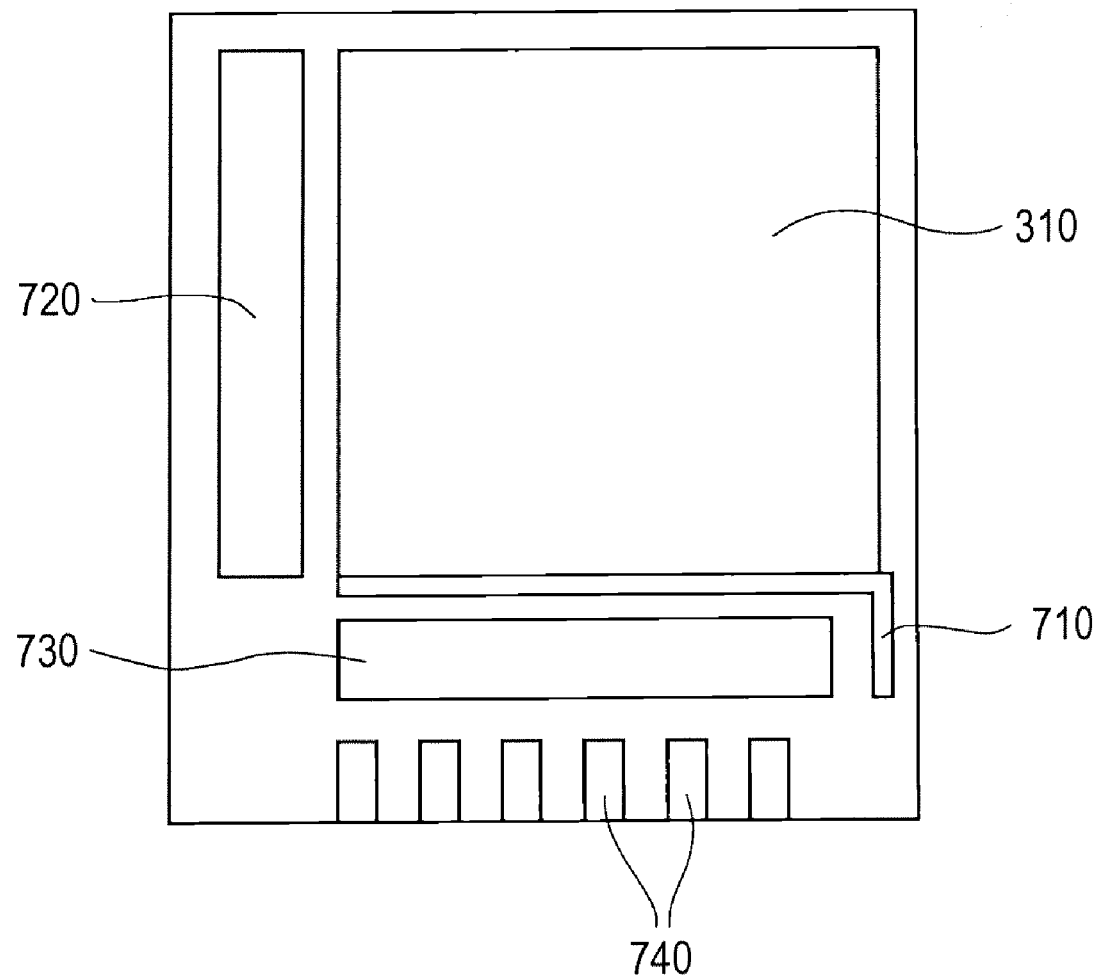
FIG. 7 is a top view of a sensing device. The said figure illustrates the placement of a silver epoxy grounding material along the edge of the sensor array in one embodiment.

When the MYLAR® film 320 is thus made conducting using any of the above-described combination of layers, the conducting layers on the film are electrically grounded. In the preferred embodiment, the conductive layers on the film are grounded using a silver epoxy 710 at the edge of the sensor array 310, as shown. These layers thus serve the purpose of conducting any electrostatic discharge, from a fingertip for example, to ground, thereby protecting the underlying sensor array and the adjacent electronic circuitry. FIG. 7 illustrates a top view where silver epoxy 710 grounds the conductive layers along an edge of the array 310. Also shown are application specific integrated circuits 720 and 730, as well as interconnect points 740 to external circuitry, that form part of the preferred embodiment.

Although the present invention has been described in detail with reference to the disclosed embodiments thereof, those skilled in the art will appreciate that various substitutions and modifications can be made to the examples described herein while remaining within the spirit and scope of the invention. For instance, the curable adhesive used to fix the MYLAR® film on to the elastomer buttons of the fingerprint sensing device may very well be applied on to the said elastomer buttons, thereby eliminating the need to cure the adhesive. It may also be that the elastomer buttons are so treated as to adhere to the lower surface of the MYLAR® film without the application of any adhesive to the MYLAR® film. In another pressure sensing device a pressure sensitive adhesive may be applied either on the surface of the sensing device or on the bottom surface of the MYLAR® film. Yet in another application, there may be no adhesive applied, either on the bottom surface of the MYLAR® film or on the surface of the array of sensing devices, or applied to only some of the sensing devices. Also, the MYLAR® film may be able to sustain the force of pressure applied in some applications, deflecting electrostatic discharge by coating it with a thin film conductive material, and therefore may not be coated with a layer of a blocked isocyanate derived polyurethane, or its equivalent.

Again, it is only one embodiment of the invention that uses a MYLAR® film upon which is coated a blocked isocyanate derived polyurethane. It could very well be that the sheet film itself is of a blocked isocyanate derived polyurethane or any such equivalent material with similar elastic and conductive properties as the blocked isocyanate derived polyurethane, thereby eliminating the need to provide a coating to the sheet film. Accordingly, those skilled in the arts may make changes and modifications and employ equivalents without departing from the spirit of the invention.

What is claimed is:

1. A method comprising the steps of:
providing on a substrate an array of sensing devices for detecting the contour of an object, each of the sensing devices operable to discriminate ridges from valleys of the object when an adjacent ridge and valley is spaced less than 800 microns apart, wherein each of the sensing devices includes a top surface;
applying under at least one of normal room temperature and normal room pressure conditions a contiguous sheet film protective covering adapted for placement over the top surfaces of the sensing devices to form a sensing apparatus, the sheet film protective covering including a plurality of layers, at least one of the layers enhancing mechanical damage resistance, one of the layers of the sheet film protective covering being polymeric film and at least a top layer of the sheet film protective covering being conductive and grounded.

2. The method according to claim 1 further comprising the step of detecting the contour of the object using the array, wherein during the detecting, the contiguous sheet film protective covering provides for force concentration to the sensing devices in the array.

3. The method according to claim 1 wherein the step of applying includes using an adhesive on a bottom layer of the contiguous sheet film protective covering that bonds with the top surface of substantially all of the sensing devices of the array.

4. The method according to claim 3 wherein, during the step of applying, a thickness of the adhesive is between 1 micron and 10 microns.

5. The method according to claim 1 wherein the top layer applied during the step of applying is contiguous.

6. The method according to claim 1 wherein the steps of providing and applying are repeated to form a plurality of the sensing devices, and wherein the step of applying forms the contiguous sheet film protective covering over a plurality of different sensing devices, the plurality of different sensing devices including a stylus input sensor, a touchpad, and a fingerprint sensor.

7. The method according to claim 1, wherein the sheet film protective covering includes a polymer layer having a thickness of between 3 micron and 50 micron.

8. The method according to claim 7 wherein the step of applying includes using an adhesive on a bottom layer of the contiguous sheet film protective covering that bonds with the top surface of substantially all of the sensing devices of the array.

9. The method according to claim 8 wherein, during the step of applying, a thickness of the adhesive is between 1 micron and 10 microns.

10. The method according to claim 1 wherein the step of applying further includes providing a polymer layer for the contiguous sheet film protective covering.

11. The method according to claim 10 wherein the polymer layer is a blocked isocyanate derived polyurethane layer.

12. The method according to claim 11 wherein the blocked isocyanate derived polyurethane layer is applied as the top layer during the step of applying, and the step of applying includes disposing conductive particles within the blocked isocyanate derived polyurethane layer thereby rendering the blocked isocyanate derived polyurethane layer conductive.

13. The method according to claim 11, wherein the blocked isocyanate derived polyurethane layer has a thickness of between 1 micron and 30 micron.

14. An apparatus for protecting an array of sensing devices that detect the contour of an object, each sensing device having a top surface, the apparatus comprising a contiguous sheet film protective covering adapted for placement over the top surfaces of the sensing devices, the sheet film protective covering including a plurality of layers, wherein:
at least one of the layers enhances mechanical damage resistance of the contiguous sheet film;
at least a top layer of the contiguous sheet film is conductive and grounded;
at least one of the layers of the contiguous sheet film is polymeric film; and
one of the layers of the contiguous sheet film is a polymer layer having a thickness between 1 micron and 50 micron, wherein
each of the sensing devices is operable to discriminate ridges from valleys of the object when an adjacent ridge and valley is spaced less than 800 microns apart.

15. The apparatus of claim 14, wherein the thickness of the at least one mechanically enhancing layer is calculated to provide a desired elastic reversible deformation of the contiguous sheet film protective covering.

16. The apparatus of claim 14, wherein the top layer of the contiguous sheet film is coated atop the polymeric film layer.

17. The apparatus of claim 16, wherein the top layer comprises a blocked isocyanate derived polyurethane layer having conductive particles disposed therein that render the top layer conductive.

18. The apparatus according to claim 14 wherein a bottom layer of the contiguous sheet film protective covering includes an adhesive that bonds with the top surface of substantially all of the sensing devices of the array.

19. The apparatus according to claim 18 wherein a thickness of the adhesive is between 1 micron and 10 microns.

20. The apparatus according to claim 14 wherein a thickness of the polymeric film layer is between 3 and 50 microns.

21. The apparatus according to claim 14 wherein the polymer layer having a thickness between 1 micron and 50 micron comprises a blocked isocyanate derived polyurethane layer.

22. The apparatus according to claim 21 wherein the top layer includes the blocked isocyanate derived polyurethane layer and further includes conductive particles disposed within the blocked isocyanate derived polyurethane layer, and wherein the conductive particles render the top layer conductive.

23. The apparatus according to claim 22 wherein the conductive particles include Indium Tin Oxide particles.

24. The apparatus according to claim 21 wherein the conductive particles includes at least one of silver particles and silver nano-particles.

25. The apparatus according to claim 21 wherein the conductive particles includes at least one of carbon nano-particles, carbon nano-tubes and graphite particles.

* * * * *